United States Patent
Buck, Jr.

[11] 3,861,674
[45] Jan. 21, 1975

[54] COMPOSITE DIVING BOARD
[75] Inventor: Norman Buck, Jr., Seattle, Wash.
[73] Assignee: Norman Buck Manufacturing Co., Inc., Seattle, Wash.
[22] Filed: July 9, 1973
[21] Appl. No.: 377,632

[52] U.S. Cl. ............... 272/66, 52/720, 161/37, 161/43, 161/44, 161/159, 161/190
[51] Int. Cl. ...... B32b 3/16, B32b 27/40, B32b 3/02, A63b 5/10, B32b 5/18
[58] Field of Search .................. 161/43–44, 161/37, DIG. 4, 69, 190, 159; 272/66; 52/720–721

[56] References Cited
UNITED STATES PATENTS

| | | | |
|---|---|---|---|
| 2,831,688 | 4/1958 | Knox | 161/43 X |
| 3,035,837 | 5/1962 | Austin | 272/66 |
| 3,184,233 | 5/1965 | Cook | 272/66 |
| 3,249,659 | 5/1966 | Voelker | 161/69 X |
| 3,416,793 | 12/1968 | Fox | 272/66 |
| 3,709,733 | 1/1973 | Mautner | 161/69 X |

*Primary Examiner*—Philip Dier
*Attorney, Agent, or Firm*—Clinton L. Mathis

[57] ABSTRACT

A composite diving board has an inboard end portion adapted to be secured to a fixed support, an intermediate and fulcrum area portion to be supported by a fulcrum, and a free tip end portion.

Such a composite diving board comprises a metallic core and an enveloping tubular structure. The metallic core comprises preferably a plurality of longitudinally extending extruded members adhesively bonded together to form a longitudinally extending web with downwardly projecting ribs. The strength of the bond between said extruded members is increased by bonding a horizontal member, preferably metallic, to the upper surface of the web. While said web and ribs may be formed by a single extrusion, extrusion problems increase with the cross-section size increase of the extrusion and hence, the multiple piece construction of smaller pieces is preferable.

The enveloping tubular structure comprises substantially low density polyurethane foam disposed between the metallic ribs and adjacent the outside of the ribs on both sides and at all areas other than the fulcrum area and the fixed end portion of the board. Preferably, the lower surface of the foam and the lower edges of the ribs lie in a common plane. A convering layer, preferably of fiberglass and resin, envelopes the metal web and the foam and is connected therewith. Preferably, a skid-resisting surface is disposed over the top surface of the board and over the horizontal member secured to the top of the web. Blocks of closed cell, relatively low density neoprene are disposed between the ribs, underlie and are connected with the botton of said web, and are disposed at the fulcrum areas of the board. Blocks of solid polyethylene are disposed between the ribs, underlie and are connected with the bottom of said web, and are disposed at the anchor or inboard end of the board. Below said blocks are disposed sheets of solid, relatively high density neoprene.

Other features are disclosed, the principal ones of which include: watertight sleeve means passing through the board at the fixed or inboard end portion; bolt means passing through said sleeve and securing the inboard end of the board to a fixed support; a layer of skid-resisting means covering the upper heads of said bolt means and covering the upper surface of the board; and means to bond the various parts of the composite board together.

16 Claims, 12 Drawing Figures

COMPOSITE DIVING BOARD

BACKGROUND OF THE INVENTION

Metal diving boards have been successful with constructions such as those shown in U.S. Pat. Nos. 2,678,213 and 2,864,616, issued, respectively, to Norman Buck and Raymond C. Rude. The said Buck Patent discloses longitudinally extending I beams and the Rude Patent discloses longitudinally extending metal ribs with downwardly projecting, integral, metallic ribs. The Rude Patent recognizes that a transverse, torsional problem exists with metal boards comprising a web and downwardly projecting ribs and he attempts to solve this problem by providing a channel-shaped torsion brace on the underside of the board symmetrically about the longitudinal center line of the board. However, boards of my invention demonstrate that the problem involved was not completely solved by the said Rude Patent.

SUMMARY OF THE INVENTION

The present invention is an improvement in diving boards and provides for a metallic core formed from a plurality of bonded together metallic members forming a longitudinally extending web with longitudinally extending, downwardly projecting ribs. Such a core is combined with polyurethane foam; fiberglass and resin; blocks of closed cell, relatively low density neoprene; and sheets of relatively high density neoprene to provide a board with desired performance characteristics, such as, the desired spring performance and with control of twisting or torsion crosswise of the board; superior strength; abrasion resistance; sound deadening at the fulcrum area; and corrosion resistance.

More specifically, the novel structure of my invention providing for such desired performance characteristics includes a composite diving board having an inboard end portion adapted to be secured to a fixed support, an outboard free end support, and an intermediate portion to be supported by a fulcrum. The metallic core of my board comprises a plurality of pieces and which core has a web and downwardly projecting ribs. Substantially low density polyurethane foam is disposed between and connected with the ribs and also connected with the bottom surface of said web. The lower surface of the foam is preferably flush with the bottom surface of the ribs. Also, foam is disposed adjacent the outer surface of the ribs, adjacent the bottom surface of the web, and the foam extends angularly toward and terminates at the outer side edges of said ribs. A layer of fiberglass and resin encloses and envelopes said foam, web, and ribs.

At the inboard end of the board, sleeves pass through the board and bolts pass through said sleeves and secure the inboard end of the board to a fixed support.

At the fulcrum portion of the board, blocks of relatively low density neoprene are disposed between said ribs and are connected with the bottom portion of the metal web and the sides of the metal ribs through a layer of fiberglass and resin disposed therebetween. Also, a primer layer is disposed between the fiberglass and resin and the adjacent metal portion to enhance adherence between the fiberglass and the said metal portion.

Blocks of polyethylene are disposed between said ribs and are connected with the bottom portions of the metal web and the sides of the metal ribs through a layer of fiberglass and resin disposed therebetween, all at the inboard or fixed end portion of the board.

Sheets of relatively high density neoprene are disposed below and, respectively, adhered to the blocks of relatively low density neoprene and to the blocks of polyethylene. Said sheets of relatively high density neoprene are, respectively, located at the inboard end and fulcrum area portions of the diving board.

At the inboard end portion, bolt means are employed to secure the end portion of the board to a fixed securing means and such bolts have their head end portions covered and have their body portions engaged in plastic tubes to protect the metal thereof from being wetted and corroded.

Other features of my invention will become inherent or implicit as the detailed description of my invention proceeds in connection with the drawings, wherein like reference numerals relate to like parts, and wherein:

THE DRAWINGS

Figure 6:
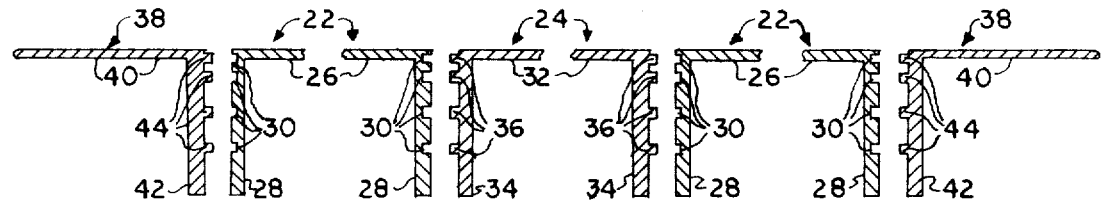
FIG. 6 is a sectional view, with parts broken away and with parts removed, and taken substantially at the level of line 9—9 of FIG. 1.
Figure 4:
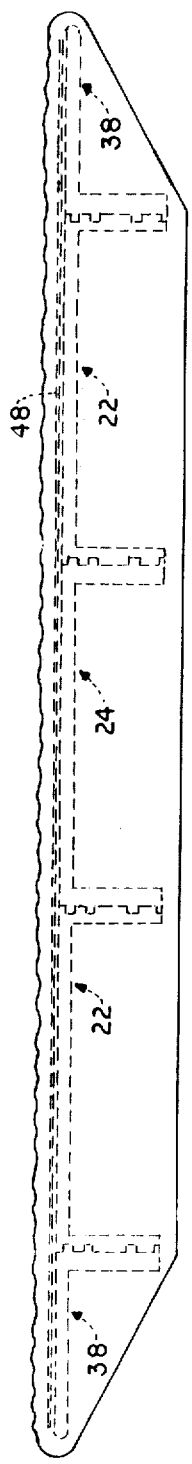
FIG. 4 is an elevational view, taken substantially on broken line 4—4 of FIG. 1, the inner webs, ribs, and horizontal covering sheet being shown in dotted lines.
Figure 7:
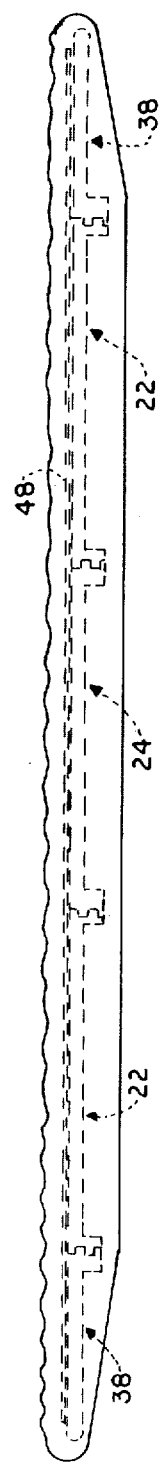
FIG. 7 is an elevational views, similar to FIG. 4, and taken substantially on broken line 7—7 of FIG. 1.
Figure 9:
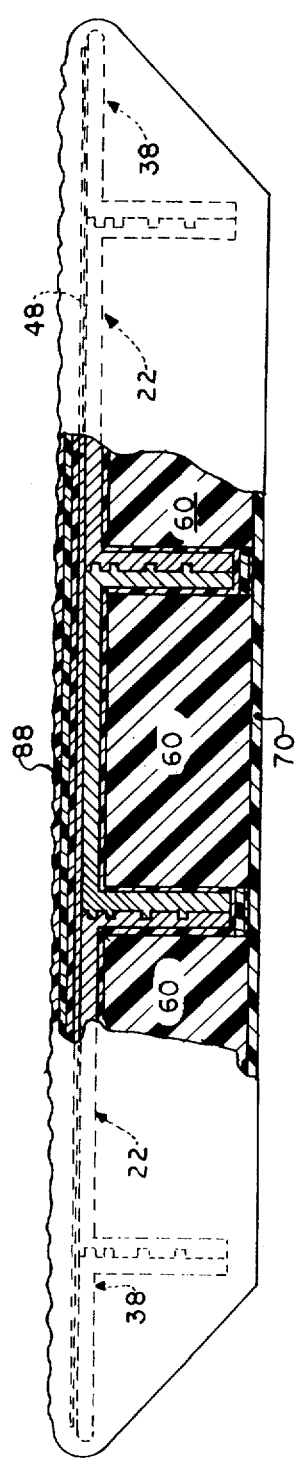
FIG. 9 is an elevational view, with parts in section, and taken substantially on broken line 9—9 of FIG. 1.

The metal core of the board of my invention comprises a plurality of metallic channel sections 22 and 24 (see particularly FIGS. 4, 6, 7, and 9), each of which extends longitudinally of, and for the full length of, the board, and tapers in thickness (FIGS. 2, 4, 7, and 9). Each section 22 comprises a web portion 26 and rib portions 28. The rib portions 28 are provided with vertically spaced grooves 30 (FIG. 6). Preferably, there will be an odd number of sections 22, 24, such as three. Channel section 24 will be a mid section, and where three sections are employed, there will be a section 22 on either side of section 24. Sections 24 comprises a web portion 32 and rib portions 34. The rib portions 34 are provided with vertically spaced tongues 36. At each side, an angle section 38 extends longitudinally of, and for the full length of, the board. Each angle section 38 comprises a web section 40 and a rib section 42. Each rib section 42 is provided with vertically spaced tongues 44. The vertically spaced tongues 44 and 36 and vertically spaced grooves 30 form inter-fitting tongue-and-groove connections.

Preferably two vertically spaced tongues 36, 44 and two vertically spaced grooves 30 are disposed within the upper one-half inch of the height of the rib sections 42, 34 and rib section 28, so that as the board tapers toward the free end portion thereof (see FIGS. 7 and 8), there will be at least two tongues and grooves inter-fitting for structural advantages in the board.

Figure 5:
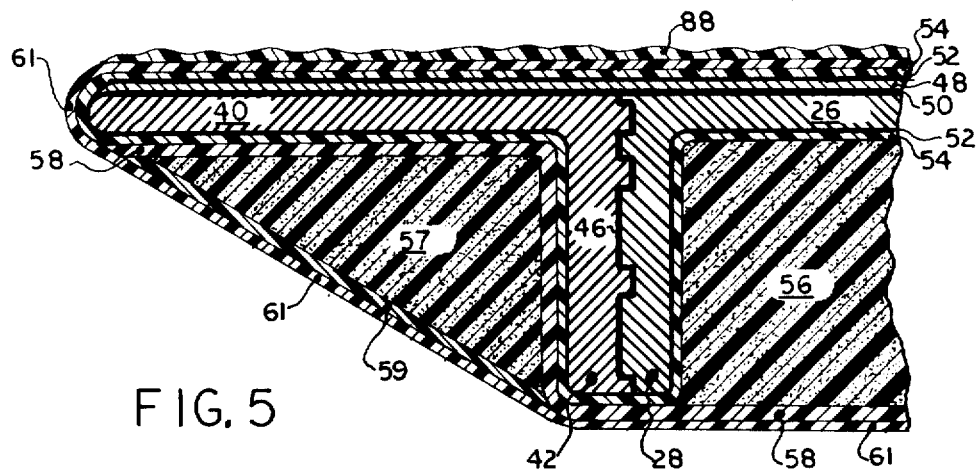
FIG. 5 is a fragmentary sectional view, on a larger scale, and taken substantially on broken line 5—5 of FIG. 1.
Figure 8:
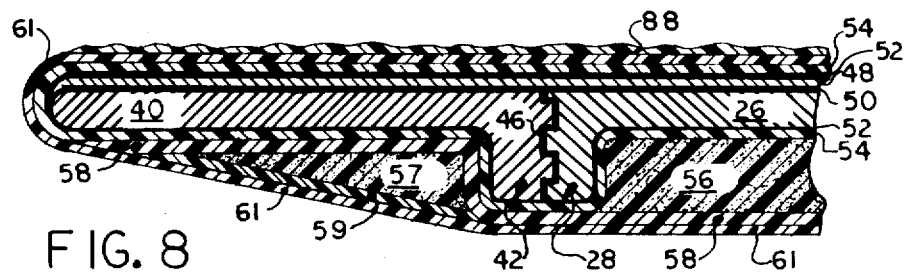
FIG. 8 is a fragmentary sectional view, on a larger scale, and taken substantially on broken line 8—8 of FIG. 1.

As indicated in the figures, such as FIGS. 5 and 8, an adhesive layer 46 is provided between rib parts, including tongues 44 and 36 and grooves 30 (see FIG. 6) to rigidly bind the various sections together to provide a metal core comprising a rigid web formed of sections 22, 24, and 38 and downwardly projecting ribs carried by the web and each formed of two rib portions as 42, 28 or 28, 34. The sections 22, 24, and 38 are preferably metallic extrusions and of a suitable aluminum alloy. The channel and angle sections 22, 24, 38 are preferably extrusions and subsequently to being extruded have been machined to provide a board of desired contour and taper. By having the web and ribs of my invention formed of a plurality of sections, minimum difficulties are encountered in the extrusion of walls and ribs of the desired thicknesses and dimensions for a diving board. Also, substantial savings are effected in extruding parts of such lesser dimensions over a board not made up of sections. The various sections are secured together by interfit of the vertically spaced tongues and grooves and also by the adhesive layer 46 employed in bonding the various sections together. The adhesive employed is an adhesive commonly used for binding metal to metal, such as an epoxy resin adhesive. A suitable adhesive is a typical high strength, flexible, epoxy resin, such as that manufactured by Minnesota Mining & Manufacturing Co., and sold under the trade designations of Part A and Part B.

Figure 10:
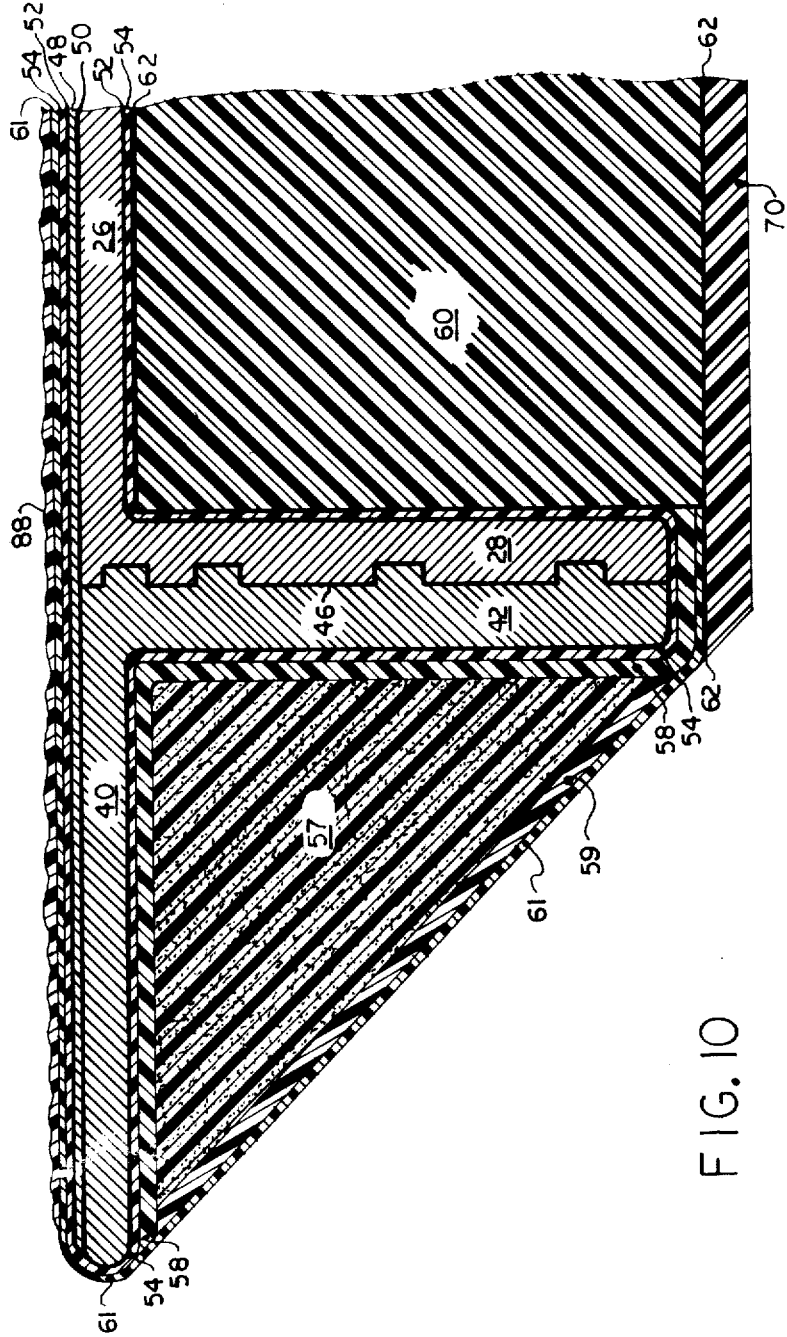
FIG. 10 is a fragmentary sectional view, on a larger scale, and taken substantially on broken line 10—10 of FIG. 1.

A horizontal sheet 48 (see for example FIGS. 5 and 10) extends substantially the full length and width of the board and is adhered by adhesive layer 50 to the upper surfaces of the metallic webs 26, 32, and 40 of channel and angle sections 22, 24, 38 and this whether the channel and angle sections are a single extrusion or formed of a plurality of pieces. The sheet 48 is preferably a metal sheet of an aluminum alloy but the same may comprise a sheet of fiberglass and resin. Where a plurality of pieces are involved to form the web and ribs, the sheet 48 aids in binding the pieces together as a unit. Also the sheet 48 is preferably of more corrosive resistant alloy than sections 22, 24, and 38 and thus would be useful even though the web and downwardly projecting ribs are formed of a single piece.

The channel sections 22 and 24, angle sections 38 and horizontal sheet 48 are all securely bonded together and function as a precision, unitary, core for a diving board having a web 26, 32, 40, 48 and downwardly projecting ribs 42, 28, 34.

In all cases, the sheet 48 becomes a part of the core of the diving board. When the sheet 48 is metallic, the same adhesive may be used to form adhesive layers 46 and 50. Where the sheet 48 is fiberglass and resin, a primer followed by a resin adhesive may be employed, as will be discussed later for similar bonds.

After such a core is constructed, all of the metallic, external surfaces thereof are treated with a metal etching primer layer 52 and then a layer of fiberglass and resin 54 (for this detail see FIGS. 5, 8, 10 and 11) is provided over such external surfaces. The purpose of the primer is to ensure a satisfactory bond between the metal surfaces and the fiberglass and resin 54. Metal etching primers suitable for layer 52 are common and readily available on the market. The layer of fiberglass and resin 54 may comprise 8 oz. fiberglass cloth, strand, chopped fiberglass strand, or mat impregnated with a polyester resin. This layer 54 completely envelopes the external surface of the core which comprises the bottom of web 40, 26, 32, depending ribs 42, 28, 34, and the top of horizontal sheet 48.

The next step in the construction of the board is the pouring of a foam, as polyurethane foam 56 (FIGS. 5 and 8), in place at the bottom and filling the center three channels formed by depending rib portions 28, 34. The filling should be to an excess and then such excess removed so that the bottom surface of foam 56 is substantially flush with the lower edges of the dependent rib portions 28, 34 (see for example FIGS. 5 and 8). Such procedure ensures that the space is completely full and also provides a cut surface which is easier to adhere to than the previous uncut surface.

Figure 1:
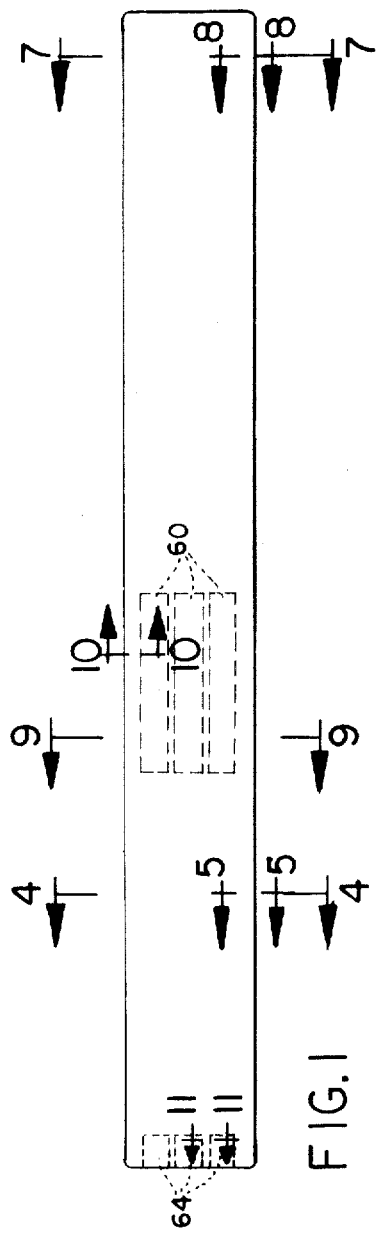
FIG. 1 is a top plan view of a diving board of my invention.
Figure 2:
FIG. 2 is a side elevation.
Figure 3:
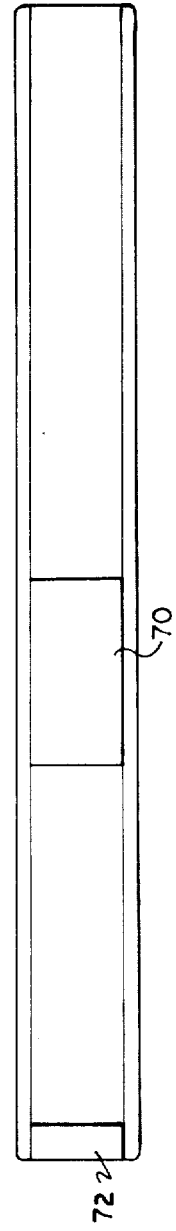
FIG. 3 is a bottom plan.

At the inboard end (see FIGS. 1 and 11), recesses are cut into the foam 56 (not cutting or removing the adjacent fiberglass and resin 54) of a size to snugly receive blocks 64 of polyethylene coated with a layer 66 of a suitable adhesive, as an epoxy resin, which will adhere said blocks 64 to the fiberglass and resin 54 adjacent rib portions 28 and 34 and against the cut surface of the foam left remaining between said rib portions at the ends of the cuts.

The layer of fiberglass and resin 54 is preferably formed of relatively light-weight material, such as 4–8 oz., and a layer of heavier weight, such as 20–50 oz., fiberglass and resin is provided to produce desired strength to the envelope. This layer 58 is disposed over the layer 54, located at the bottom of the core not covered by the foam 56, and also over the exposed surface of said foam 56 and the lower surfaces of blocks 64. This provides for a double layer of fiberglass and resin on the underside of the angle sections 38 and under the lower portions of the rib sections 42, 28, and the rib sections 28, 34. Also, a single layer is provided under the lower surface of the foam 56. Where a layer of fiberglass and resin is applied over a layer of similar material, no primer is needed between the two layers, although sanding a layer before the application of the subsequent layer is good practice. As previously indicated, where a layer of fiberglass and resin, as 54, is to be secured to a metal layer, the metal should be first treated with a suitable primer 52 before the application of a layer of fiberglass and resin.

A foam layer 57, similar to foam layer 56, is disposed in each angle section 38 and adhered to fiberglass and resin layer 58. Again, foam is poured to an excess and then cut to provide a cut on a plane extending substantially from a point at the bottom of rib portion 42 to a point at the outer end of web portion 40. Then a layer of fiberglass and resin 59 is disposed over and adhered to each of the said cut surfaces of foam. The fiberglass of layer 59 may be 10–20 oz.

A second envelope is provided by a layer 61 of fiberglass and resin. This layer lies adjacent and is adhered to (FIGS. 5 and 8) layers 59 and 58. This layer 61 may be traced starting at the left side of the board (as appears in FIG. 8) under layer 59 to the level of rib portion 42, thence under layer 58 and continuing to the level of rib portion 42 on the other side of the board, thence under layer 59 on that side of the board, and thence over layer 54 to the point of beginning. The weight of the fiberglass in layer 61 may be the same as that of layer 54. This second envelope completely covers all parts of the board previously described and augments the action of layer 54 in providing transverse torque control of the board.

At the fulcrum area portion (see FIGS. 1, 9 and 10), the foam 56 and fiberglass and resin layers 58 and 61 are cut to provide a set of separate, and preferably, rectangular shaped recesses. These recesses are filled with blocks 60 of closed cell neoprene. The blocks 60 are coated with an adhesive to provide adhesive layers 62 on their tops and side wall portions, adhering such blocks 60 to the layer 54 of fiberglass and resin at their side and top surfaces and to the foam 56 at their end surfaces.

The adhesive layer 62 comprises a liquid neoprene as the adhesive. In applying such adhesive 62, the board is turned upside down, the adhesive 62 applied on the then bottom and side walls of the recess, blocks 60 (of an appropriate fit not to wipe off too much adhesive) are inserted in place, and then further adhesive is applied encasing the blocks 60, covering the then top thereof, and completely filling the recesses.

The recesses at the inboard or fixed end of the board are filled with fitted blocks 64 (see FIGS. 1 and 11) of polyethylene which are adhered at theit top and side wall portions by adhesive layer 66 to layer 54 of the fiberglass and resin. The adhesive layer 66 is a resin and the same is applied in a similar manner and similarly encases blocks 64 as did adhesive 62 encase blocks 60.

The blocks 60, at the fulcrum area, function as a cushion to dampen vibration, absorb noise, and spread the impact of a diver using the board so that the impact is spread the full width of the diving board and such blocks 60 may be formed of low density, closed cell neoprene or any other suitable material.

The blocks 64 at the inboard or fixed end of the board resist compression of the board as forces are applied to fixedly secure the same to a fixed support. Also, said blocks 64 widen the contact area at the fixed end of the board to a fixed support and thus reduce abrasion of the lower end portion of the rib portions of the core of the board.

Below the blocks 60 and at the fulcrum area and below the blocks 64 and at the inboard or fixed end portion of the board, sheets 70 and 72 of high density neoprene are, respectively, disposed. The sheet 70 is adhered to blocks 60 by any suitable adhesive, such as a liquid neoprene. Sheet 70 overlaps the edges of the opening made to receive blocks 60. The sheet 70 is also adhered to the portions of the fiberglass and resin (FIG. 10) surrounding said opening and thus, sheet 70 completes the integrity of the envelope by layer 61, which integrity was interrupted to form the openings to receive the block 60. At the fulcrum area, blocks 60 and a sheet 70 are better able to resist the forces resulting from constant impact and bending (while the board is in use) than a layer of fiberglass and resin (as layer 61) disposed over blocks 60. Sheet 70 functions as a wear plate and rests directly on the diving board fulcrum which is employed. The sheet 72 is adhered to the layer of fiberglass 61 (FIG. 11) at the inboard end of the board. This sheet 72 functions as a wear plate and, like blocks 64, resists compression as the inboard end of the board is bolted to a fixed support.

Holes are drilled through the board at the inboard end portion thereof, and sleeves 74 and 76 are inserted in said holes. The stem portion of sleeve 76 is inserted from the top of the board downwardly while the stem portion of the sleeve 74 is inserted from the bottom of the board upwardly and the sleeve 74 is surrounded by the stem of sleeve 76. The stem of sleeve 76 is adhered to the walls forming the hole through which it passes, thus, preserving the watertight integrity of the board. Headed bolts 78 pass through the openings in sleeve 74.

Instead of using carriage bolts and the need of a square hole at the head end portion of such a hole, I employ downwardly projecting, pointed, piercing portions 80 depending from the heads 82 of bolts 78. An end support 84 is provided with a plurality of laterally spaced openings matching the openings in the fixed or inboard end portion of the board through which are projected a plurality of bolts 78. Then a nut and washer combination 86 is attached to each bolt 78 after the bolt passes through the fixed support 84. Upon the tightening of the nuts 86, the piercing portions 80 will project into the then upper surface of the board and hold the stem of bolt 78 from turning in the same manner as would the squared portion of a carriage bolt. The composition of the board at the inboard end portion is such as to resist compression and thus, after all the nuts 86 have been properly and evenly tightened, the nuts will tend to maintain the fixed end portion of the board in an adjusted position.

A skid-resisting top deck surface 88 is next disposed over the fiberglass and resin layer 61, and over the heads 82 of the bolts 78. This surface 88 is preferably suitably painted, decorated, and calibrated.

SUMMARY

From the foregoing, it will not be apparent that I have provided a metallic web and downwardly projecting ribs which may be one integral extrusion, and which is, preferably, a plurality of adhered together extrusions, as channel and angle sections 22, 24 and 38. A horizontal sheet, preferably a metallic sheet, is adhered to the upper surface of the web 40, 26, 32. Foam 56, as polyurethane, is disposed between adjacent ribs, as ribs 28 and 34. This foam 56 is connected with the underside of the said metal parts, preferably, through a layer 54 of fiberglass and resin, which layer is secured to the bottom surfaces of the web and the side walls of the ribs. To ensure a satisfactory bond of such layer to metal surfaces, the metal surfaces are first treated with a metal etching primer layer 52 before bonding the layer 54 to the metal. Thereafter, the metallic web, downwardly projecting ribs, upper horizontal sheet, and the foam between the ribs are all enclosed within an enveloping layer 54, which may be of fiberglass and resin and which layer augments the securance of the various separate parts together and provides for a unitary construction. Preferbly, the foam 56 is poured to an excess and the excess cut away to provide a lower surface flush with the lower end portions of the ribs 28 and 34. Filling of the foam to an excess ensures complete filling and then the cutting to a flush level, provides for a better adherence surface for adhering to the same of a spanning layer 58 and also provides for a continuous surface to which to adhere the spanning layer 58 as the same passes over the lower surfaces of angle sections 38, ribs 42, 28, 34, and the foam. The spanning layer is relatively thick as compared to the two enveloping layers 54 and 61 and such spanning layer is of substantial consequence in the final structural integrity of the board.

The angle sections 38 are filled with foam 57 and the foam 57 is preferably cut away to provide a cut surface which extends angularly and outwardly from the ribs 42, 28, to the outer edges on both sides of the board. Preferably, this cut surface is covered by a layer of fiberglass and resin 59. Another enveloping layer 61 covers the layer 59 at one side of the board, layer 58 on the bottom of the board, layer 59 on the other side of the board and over the layer 54 on the top surface of the board. This enveloping layer 61 also covers both end portions of the board. This enveloping layer also adds substantially to the structural integrity of the board.

I provide bolt means 78 which have their heads 82 positioned above horizontal sheet 48 and a layer of skidresisting surface means 88 covers the board and also covers the heads 82 of the bolt means 78.

I have shown blocks of cushioning material, as blocks of neoprene 60, which function to spread the load, insulate the sound, and cushion the impact at the fulcrum area of the board. These blocks are disposed between adjacent ribs at the fulcrum area of the diving board and are connected with the bottom surface of the web and with adjacent side walls of the ribs through a layer of fiberglass and resin 54.

Below the blocks 60 is located a sheet of impact and abrasion resisting material, as neoprenet sheet 70, which sheet is adapted to rest directly on the diving board fulcrum and is designed to cooperate with the blocks 60 in providing the desired impact resistance for the diving board and which sheet 70 provides for the desired wear resistance as it contacts the diving board fulcrum.

Figure 11:
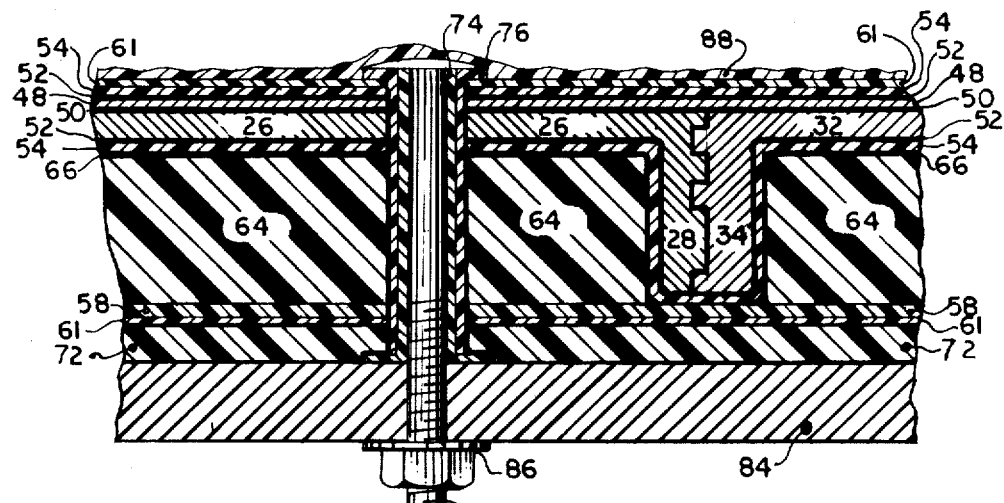
FIG. 11 is a fragmentary view, on a larger scale, and taken substantially on broken line 11—11 of FIG. 1.
Figure 12:
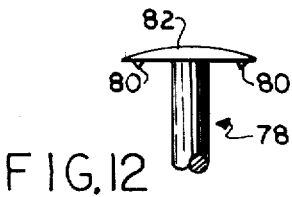
FIG. 12 is a detached, fragmentary, perspective view of one of the bolts used in FIG. 11, to secure the inboard end of the diving board to a fixed support.

At the inboard or fixed end of the board which is best ilustrated in FIG. 11, plastic sleeves 74, 75 are slidably interfitted and provide a tube through which a bolt 78 may pass and the watertight integrity at the inboard end of the board can be maintained.

Obviously, changes may be made in the forms, dimensions, and arrangements in the parts of my invention, without departing from the principle thereof, the above setting forth only preferred forms of embodiment of my invention.

I claim:

1. A composite diving board adapted to be secured at its inboard end portion to a fixed support, be supported intermediate its length by a fulcrum, and having its tip portion free and unsupported comprising: a metallic web having a plurality of downwardly projecting ribs; substantially low density polyurethane foam disposed between adjacent ribs and connected with the bottom surface of said web and the adjacent side walls of said ribs, and wherein the substantially low density polyurethane foam is adjacent the outer surface of an outer rib, adjacent the bottom surface of said web, and said foam extends angularly toward and terminates at an outer edge of said web; and an enveloping layer means enclosing and connected with said web, ribs, and polyurethane foam.

2. The combination of claim 1, wherein the lower surface of said foam is substantially flush with the lower surfaces of said ribs and the lower surface of said surface layer extends substantially in a common plane.

3. The combination of claim 1, wherein said board is enveloped in a layer of fiberglass and resin.

4. The combination of claim 3, wherein the upper surface of the board is provided with a skid-resisting surface.

5. A composite diving board adapted to be secured at its inboard end portion to a fixed support, be supported intermediate its length by a fulcrum, and having its tip portion free and unsupported comprising:
a metallic web having a plurality of downwardly projecting ribs, said web and said ribs comprising a plurality of angle and channel sections adhered together; substantially low density polyurethane foam disposed between adjacent ribs and connected with the bottom surface of said web and the adjacent side walls of said ribs; and an enveloping layer means enclosing and connected with said web, ribs, and polyurethane foam.

6. The combination of claim 5, wherein a horizontal sheet is disposed over and adhered to said web, and a covering is provided over said sheet.

7. The combination of claim 6, wherein the cover over said sheet comprises a metallic sheet.

8. The combination of claim 6, wherein bolt means are provided having heads positioned above said metal sheet and stem portions extending through the board to secure it to a fixed support means, and a layer of skid-resisting means covers the board, and covers the heads of said bolt means.

9. A composite diving board adapted to be secured at its inboard end portion to a fixed support, be supported intermediate its length by a fulcrum, and having its tip portion free and unsupported comprising: a metalic web having a plurality of downwardly projecting ribs; substantially low density polyurethane foam disposed between adjacent ribs and connected with the bottom surface of said web and the adjacent side walls of said ribs; and blocks of cushioning material disposed between adjacent ribs at the fulcrum area of the diving board and connected with the bottom surface of said web and the adjacent side walls of said ribs; and an enveloping layer means enclosing and connected with said web, ribs, and polyurethane foam.

10. The combination of claim 9, wherein a layer of fiberglass and resin is disposed between said metal web and ribs and said blocks.

11. The combination of claim 10, wherein a primer is used between said metal web and ribs and said fiberglass and resin.

12. The combination of claim 9, wherein a sheet of impact and abrasion resisting material is disposed below and connected with said blocks, said sheet being adapted to rest directly on a diving board fulcrum means.

13. The combination of claim 6, wherein bolt means extend through the board to secure it to a fixed support means, and plastic sleeve means encase the bolt means.

14. The combination of claim 5, wherein blocks of relatively high density material resisting compression are disposed between ribs at the inboard end portion of the board and are connected with the bottom surface of said web and the adjacent side walls of said ribs.

15. The combination of claim 14, wherein fiberglass and resin are disposed between said metal web and ribs and said blocks.

16. The combination of claim 14, wherein a sheet of impact and abrasion resisting material is disposed below and connected with said blocks, said sheet being adapted to rest directly on a diving board fixed support means.

* * * * *